US012099734B2

(12) United States Patent
He et al.

(10) Patent No.: US 12,099,734 B2
(45) Date of Patent: Sep. 24, 2024

(54) MEMORY BLOCK UTILIZATION IN MEMORY SYSTEMS

(71) Applicant: Micron Technology, Inc., Boise, ID (US)

(72) Inventors: Deping He, Boise, ID (US); Bo Zhou, Shanghai (CN); Caixia Yang, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 45 days.

(21) Appl. No.: 17/846,761

(22) Filed: Jun. 22, 2022

(65) Prior Publication Data

US 2023/0418491 A1    Dec. 28, 2023

(51) Int. Cl.
*G06F 12/00* (2006.01)
*G06F 3/06* (2006.01)
*G06F 12/02* (2006.01)

(52) U.S. Cl.
CPC .............. *G06F 3/064* (2013.01); *G06F 3/061* (2013.01); *G06F 3/0679* (2013.01); *G06F 12/0246* (2013.01)

(58) Field of Classification Search
CPC ........ G06F 3/064; G06F 3/061; G06F 3/0679; G06F 12/0246
See application file for complete search history.

(56) References Cited

U.S. PATENT DOCUMENTS

| | | | | |
|---|---|---|---|---|
| 7,287,123 | B2* | 10/2007 | Yoshioka | G06F 12/127 |
| | | | | 711/E12.076 |
| 7,734,851 | B2* | 6/2010 | Sunata | H04L 12/66 |
| | | | | 707/693 |
| 2017/0131916 | A1* | 5/2017 | Lee | G06F 3/0608 |
| 2017/0242612 | A1* | 8/2017 | Kimberly | G06F 12/0246 |
| 2018/0217895 | A1* | 8/2018 | Lim | G06F 11/1068 |
| 2019/0198118 | A1* | 6/2019 | Shim | G11C 16/16 |
| 2021/0200437 | A1* | 7/2021 | Li | G06N 3/08 |
| 2021/0303185 | A1* | 9/2021 | Mishra | G06F 3/0631 |
| 2023/0161666 | A1* | 5/2023 | Zamir | G06F 3/0679 |
| | | | | 714/764 |

* cited by examiner

*Primary Examiner* — John A Lane
(74) *Attorney, Agent, or Firm* — Holland & Hart LLP

(57) ABSTRACT

Methods, systems, and devices for memory block utilization in memory systems are described. A system configured to allow a memory device to group or segment a memory block into two or more sub-memory blocks, which can be independently programmed is described herein. For example, a host system may determine a configuration of a memory array, and communicate the configuration information to the memory system, and transmit a command for an operation to the memory system. In some examples, the memory system may utilize the memory array configuration information and determine to segment the blocks of memory cells into sub-blocks. By segmenting the memory block into sub-blocks, the memory device may maintain its memory block density while supporting efficient programming of blocks of the memory array.

20 Claims, 6 Drawing Sheets

MEMORY BLOCK UTILIZATION IN MEMORY SYSTEMS

FIELD OF TECHNOLOGY

The following relates to one or more systems for memory, including memory block utilization in memory systems.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
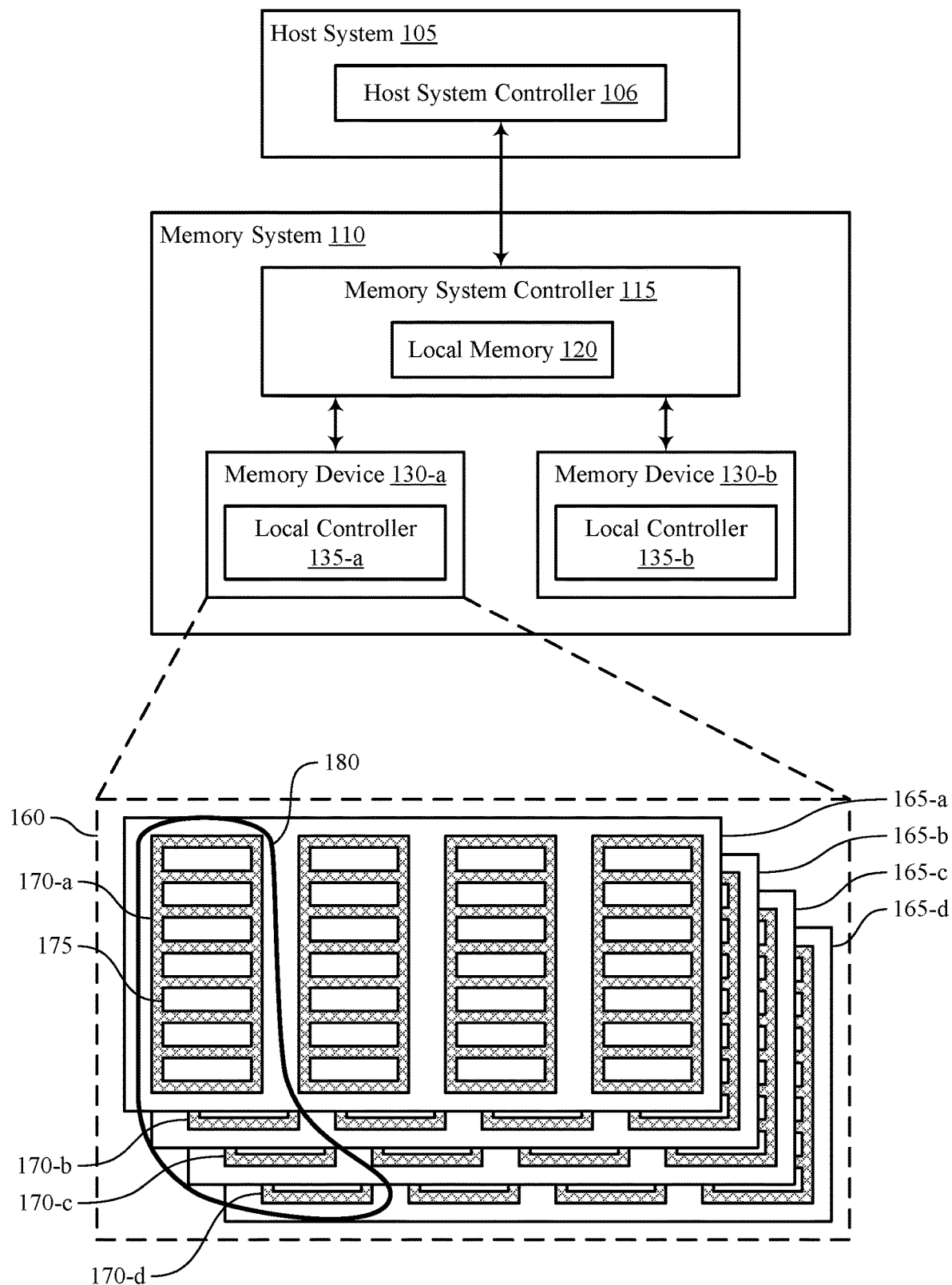
FIG. 1 illustrates an example of a system that supports memory block utilization in memory systems in accordance with examples as disclosed herein.

A memory system may include an array of memory cells, where each memory cell of the array is configured to store one or more bits of information. The array of memory cells may be segmented into memory blocks of memory cells (e.g., logical or physical memory blocks of memory cells) that may have different storage characteristics and may be accessed independently from one another. Memory blocks of memory cells (e.g., all memory cells contained within a memory block) may be allocated by a host system for a memory operation (e.g., a programming operation). However, in some instances, a memory operation may not utilize the entire memory block (e.g., due to infrequency of access, amount of data written to the memory block, special usage data (e.g., short life time or less reliability required memory blocks), etc.). Allocation of the entire memory block may be unnecessary and result in suboptimal operations for the memory device by reducing programming operation efficiency, and increasing device operation cost, among other examples. Increasing a quantity of memory blocks or memory block size for programming operations is also unsatisfactory due to overhead cost, and device size. Various aspects of the present disclosure relate to dividing a memory block into sub-memory blocks (e.g., sub-blocks) to improve operations for the memory device, among other aspects.

A system configured to enable a memory device to segment a memory block into two or more sub-memory blocks, which can be independently programmed is described herein. For example, a host system (e.g., a host system coupled with a memory system) may determine a configuration of a memory array, and communicate the configuration information to the memory system, and transmit a command for an operation (e.g., a programming operation) to the memory system. The memory system may utilize the memory array configuration information and determine to segment the memory blocks into sub-memory blocks (e.g., sub-blocks). A sub-block may include one or more memory cells within the memory array or groups of memory cells, such as one or more pages of the memory array. The memory system may group the memory cells into sub-memory blocks based on criterion (e.g., a sub-memory block including a quantity of pages of a memory block). These sub-memory blocks may then be allocated by the memory system (e.g., to store a type of data, to process a portion of a programming operation, etc.). In some examples, sub-memory blocks may be processed according to a respective priority of a respective sub-memory block, which may be determined based on the purpose of the sub-memory block, among other criteria. By grouping the memory block into sub-memory blocks, the memory device may maintain its memory block density while supporting efficient programming of memory blocks. Allocating portions of a memory block instead of an entire memory block may allow for less frequently used, or special usage data (e.g., short life time or less reliability required memory blocks) to retain a smaller portion of a memory block. This may also allow for more accurate, or less gratuitous, over-provisioning within memory blocks.

Figure 2:
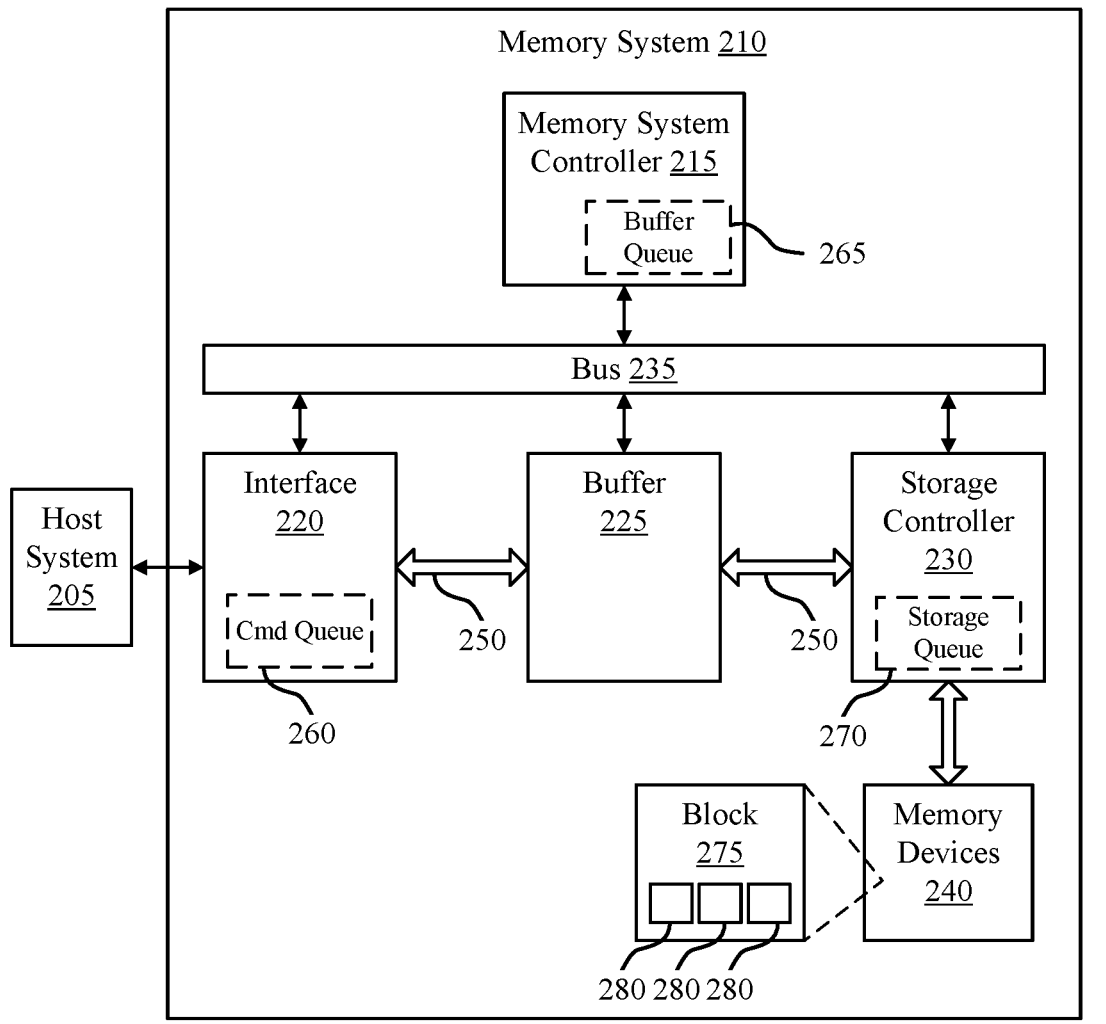
FIG. 2 illustrates an example of a system that supports memory block utilization in memory systems in accordance with examples as disclosed herein.

Features of the disclosure are initially described in the context of systems, devices, and circuits with reference to FIGS. 1 and 2. Features of the disclosure are described in the context of systems, block diagrams, and flow diagrams with reference to FIGS. 3A, 3B, and 4. These and other features of the disclosure are further illustrated by and described in the context of a block diagram and flow diagram that relate to memory block utilization in memory systems with reference to FIGS. 5 and 6.

FIG. 1 illustrates an example of a system 100 that supports memory block utilization in memory systems in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-$a$ and 130-$b$ are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage memory operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130. As an illustrative example, the memory system controller 115 may execute a memory operation that may include instructions for programming one or more memory cells of the memory device 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof.

Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, a memory device 130 may be a memory package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170 (also referred to as a memory blocks), where each block 170 may include a respective set of pages 175, and each page 175 may include a set of memory cells. A block 170 refers to a portion of the memory cells of the memory device 130, including one or more pages 175, where each page 175 may include a quantity of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line). In some cases, a block 170 may be grouped or segmented into one or more sub-blocks (e.g., sub-memory blocks). A sub-block may refer to a portion of a block 170, (e.g., a subset of the one or more memory cells within a block 170, a subset of one or more pages 175 within a block 170, among other examples). For example, a sub-block may include a number of pages within a block 170 (e.g., a group of pages 175 within a specific range of page numbers). Each sub-block may be independently programmed based on allocation by the memory system controller 115.

For some NAND architectures, memory cells may be read and programmed (e.g., written) at a first level of granularity (e.g., at the page level of granularity) but may be erased at a second level of granularity (e.g., at the block level of granularity). Further, in some cases, NAND memory cells may be erased before they can be re-written with new data. Thus, for example, a used page 175 may, in some cases, not be updated until the entire block 170 that includes the page 175 has been erased.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support memory block utilization in memory systems. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some examples, a memory system 110 may include a memory device 130 containing an array of memory cells, where each memory cell of the array is configured to store one or more bits of information. The array of memory cells may be segmented into blocks 170 of memory cells (e.g., logical or physical blocks of memory cells) that may have different storage characteristics and may be accessed independently from one another. Blocks 170 of memory cells (e.g., all memory cells contained within a block) may be allocated by a host system 105 for a memory operation (e.g., a programming operation). However, in some instances, a memory operation may not utilize the entire block 170 of memory cells (e.g., due to infrequency of access, amount of data written to the block, special usage data (e.g., short life time or less reliability required memory blocks), etc.). Allocation of the entire block 170 may be unnecessary and result in suboptimal operations for the memory device 130 by reducing programming operation efficiency, and increasing device operation cost, among other examples. Increasing a number of blocks 170 or memory block size for programming operations is also unsatisfactory due to overhead cost, and device size. Accordingly, a system configured to segment a block 170 into sub-blocks may be desirable.

The system 100 may enable a memory device 130 to segment a block 170 into two or more sub-blocks (e.g., sub-memory blocks), which can be independently programmed as described herein. For example, a host system 105 (e.g., a host system 105 coupled with a memory system 110) may determine a configuration of a memory array, and communicate the configuration information to the memory system 110, and transmit a command for an operation (e.g., a programming operation) to the memory system 110. The memory system 110 may utilize the memory array configuration information and determine to segment the blocks 170 into sub-blocks. The memory system 110 may segment the sub-blocks based on a criteria (e.g., a sub-block including some pages of a block 170 of memory cells). These sub-blocks may then be allocated by the memory system 110 (e.g., to store a type of data, to process a portion of a programming operation, etc.). By segmenting the block 170 into sub-blocks, the memory device 130 may maintain its block density while supporting efficient programming of blocks 170. Allocating portions of a block 170 instead of an entire block 170 may allow for less frequently used, or special usage data (e.g., short life time or less reliability required blocks) to retain a smaller portion of a block 170. Die yield may be improved (e.g., more cells per die may be utilized for memory operations as opposed to excess memory cells remaining unused if an entire block 170 is allocated for one purpose). This may also allow for more accurate, or less gratuitous, overprovisioning within blocks 170.

FIG. 2 illustrates an example of a system 200 that supports memory block utilization in memory systems in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

In some examples, a memory system 210 may include a memory device 240 containing a block 275, which may be an example of a block 170 as described with reference to FIG. 1. The block 275 may be grouped or segmented into two or more sub-blocks 280, each sub-block 280 including a set of memory cells (e.g., logical or physical blocks of memory cells) that may have different storage characteristics and may be accessed independently from one another. Block 275 may be allocated by a host system 205 for a memory operation (e.g., a programming operation). However, in some instances, a memory operation may not utilize the entire block 275 (e.g., due to infrequency of access, amount of data written to the block, special usage data, etc.). Allocation of the entire memory block 275 may be unnecessary and result in suboptimal operations for the memory device 240 by reducing programming operation efficiency, and increasing device operation cost, among other examples. Increasing a quantity of memory blocks 275 or memory block size for programming operations is also unsatisfactory due to overhead cost, and device size.

The system 100 may be configured to enable the memory system 210 to group or segment the block 275 into two or more sub-blocks 280, which can be independently programmed as described herein. For example, the host system 205 may determine a configuration of a memory array, communicate the configuration information to the memory system 210, and transmit a command for an operation (e.g., a programming operation) to the memory system 210. In some examples, the memory system 210 may utilize the memory array configuration information and determine to segment the block 275 into sub-blocks 280. The memory system 210 may group or segment the block 275 into sub-blocks 280 based on a criterion (e.g., a sub-block including some pages of a block 170 of memory cells). These sub-blocks 280 may then be allocated by the memory system 210 (e.g., to store a type of data, to process a portion of a programming operation, etc.). By segmenting the block 275 into sub-blocks 280, the memory device 240 may maintain its block density while supporting efficient programming of sub-blocks 280. Allocating portions of a block 275 instead of an entire block 275 may allow for less frequently used, or special usage data (e.g., short life time or less reliability required blocks) to retain a smaller portion of a block 275.

Figure 3A:
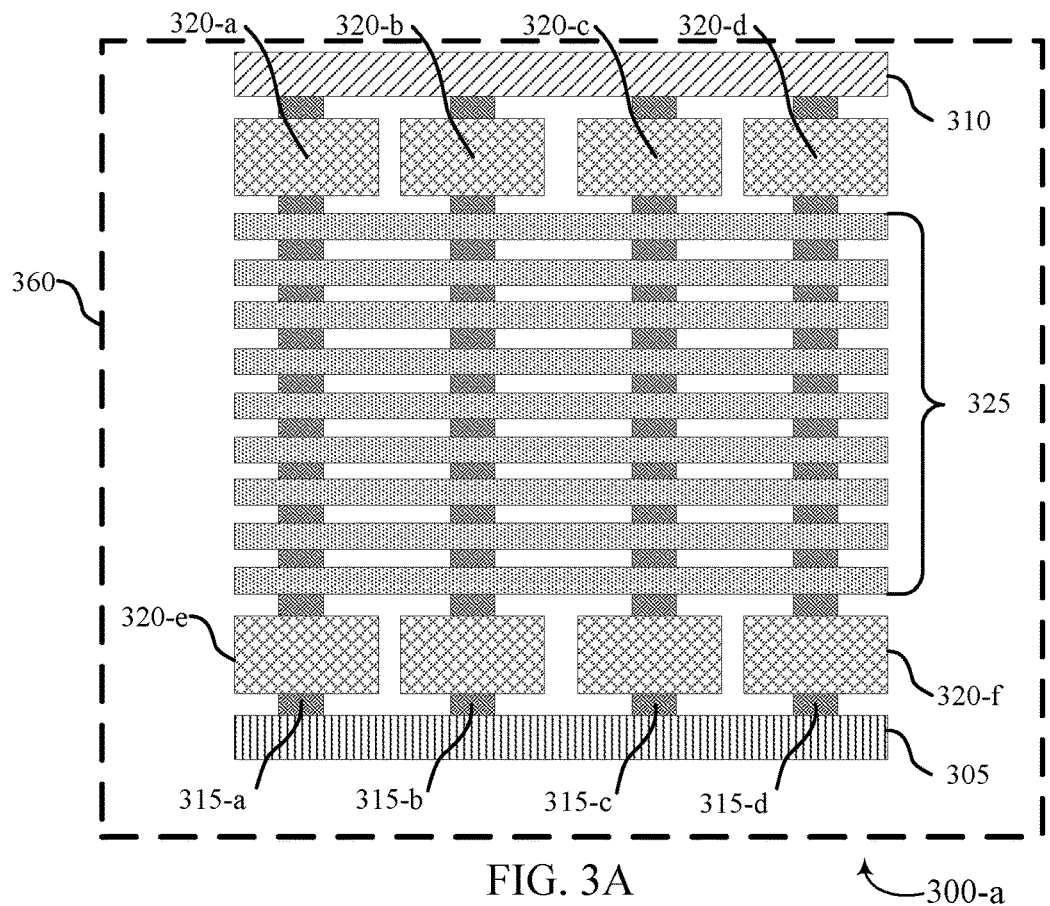
FIGS. 3A and 3B illustrate examples of memory devices that support memory block utilization in memory systems in accordance with examples as disclosed herein.

FIG. 3A illustrates an example of a memory device 300-a that supports memory block utilization in memory systems in accordance with examples as disclosed herein. In some cases, the memory device 300-a may be an illustrative example of a block 170 as described with reference to FIG. 1 or a block 275 as described with reference to FIG. 2. It should be appreciated that the components and features of the memory device 300-a are shown to illustrate functional interrelationships, and not necessarily actual physical positions within the memory device 300-a. Further, although some elements included in FIG. 3A are labeled with a numeric indicator, some other corresponding elements are not labeled, even though they are the same or would be understood to be similar, in an effort to increase visibility and clarity of the depicted features.

The memory device 300-a as illustrated in FIG. 3A may be an example of aspects of a block 170 as described with reference to FIG. 1. For example, the memory device 300-a may include a block 360. The memory device 300-a may include a line 305 that can carry a signal, such as a source line signal (SRC). The line 305 can be structured as a conductive line (which includes conductive materials) and can form part of a source (e.g., a source line) of the memory device 300-a. The memory device 300-a may also include a data line (e.g., bit line) 310. The data line 310 may carry signals (e.g., bit line signals) to selectively exchange information (e.g., data) between memory cells within a block 360.

The memory device 300-a may further include pillars (e.g., conductive pillars) 315. FIG. 3A illustrates pillars 315-a, 315-b, 315-c, 315-d, though the memory device 300-a may include any quantity of pillars 315. FIG. 3A also illustrates access lines (e.g., word lines) 325. Each memory cell may be associated with a separate access line 325. Access lines 325 can carry signals (e.g., bit line signals), and may be used by the memory device 300-a to selectively access memory cells within a block. The memory device 300-a may further include select lines 320 (e.g., drain select lines) which may carry signals (e.g., drain select-gate signals). FIG. 3A illustrates select lines 320-a, 320-b, 320-c, 320-d, 320-e, 320-f, though any quantity of select lines may be included, carrying any quantity of signals.

The memory device 300-a may include a block 360, which may be an example of a block 170 as described with reference to FIG. 1. Each memory cell may be programmed to store a logic value representing one or more bits of information. In some cases, a single memory cell—such as an SLC memory cell—may be programmed to one of two supported states and thus may store one bit of information at a time (e.g., a logic 0 or a logic 1). A block that contains SLC memory cells may be referred to as an SLC block. The memory device 300-a may allocate a block 360 (e.g., an SLC block) to process a type of operations, a type of commands, or store a type of data. For example, when a command is received from a host system to store a type of data, the memory device 300-a may allocate a block to serve this purpose. A data type may refer to a subset of data stored within the memory device 300-a. Types of data may include user data, log data, firmware data, special usage data (e.g., short life time or less reliability required blocks), or other types not listed. The quantity of blocks available within the memory device 300-a may be fixed, or otherwise difficult (e.g., costly) to increase.

As an illustrative example, a host system may transmit a command to the memory device 300-a to generate or update a type of special usage data (e.g., a BBT, for example). In response, the memory device 300-a may allocate an entire block to store the BBT data. In some cases, such special usage data may not utilize the total quantity of memory cells available within the allocated block, taking up a relatively small portion of the available storage space. For example, a block may contain a quantity of memory cells to deliver an amount of storage space (e.g., 2 GB in the case of x8 B58R). Allocating an entire block to one data type (e.g., special usage data) may contribute to excess overprovisioning and higher device cost, leaving many memory cells within the allocated block unutilized.

A block may be a set of multiple pages as described with reference to FIG. 1. A page may be a set of memory cells that are each associated with (e.g., coupled with) a corresponding word line 325. Memory cells in a same page may share (e.g., be coupled with) a common word line 325, and memory cells in a same string may share (e.g., be coupled with) a common data line (e.g., bit line). Thus a block may include memory cells from multiple different pages.

A block may further include a block configuration. A memory block configuration may refer to the information related to the pages and memory cells assigned to a block, including the quantity and address information for pages and memory cells included in a block. For example, a quantity of pages including a quantity of memory cells may be assigned to a block. The block configuration information including which pages and cells are assigned to a specific block may be stored and maintained by the memory system (e.g., in an L2P table, for example), and communicated by the memory system to the host system. The memory configuration information may include, for example, a list of page numbers assigned to a particular block or sub-block and the associated addresses of the memory cells within each page.

The memory device 300-*b* may include a block 370, which may be an example of a block 170 as described with reference to FIG. 1., for example. In some cases, memory cells within a block may be programmed (e.g., set to a logic value) and read from at the page level of granularity. In some additional or alternative cases, memory cells may be programmed at the block level, where each page within a block may be programmed to a logic value. As an illustrative example, an entire block may be programmed to store a logic value, such as a logic 0. In some examples, a block may be segmented by the memory system into two or more smaller blocks that may be independently processed (e.g., programmed, written to, read from).

Figure 3B:
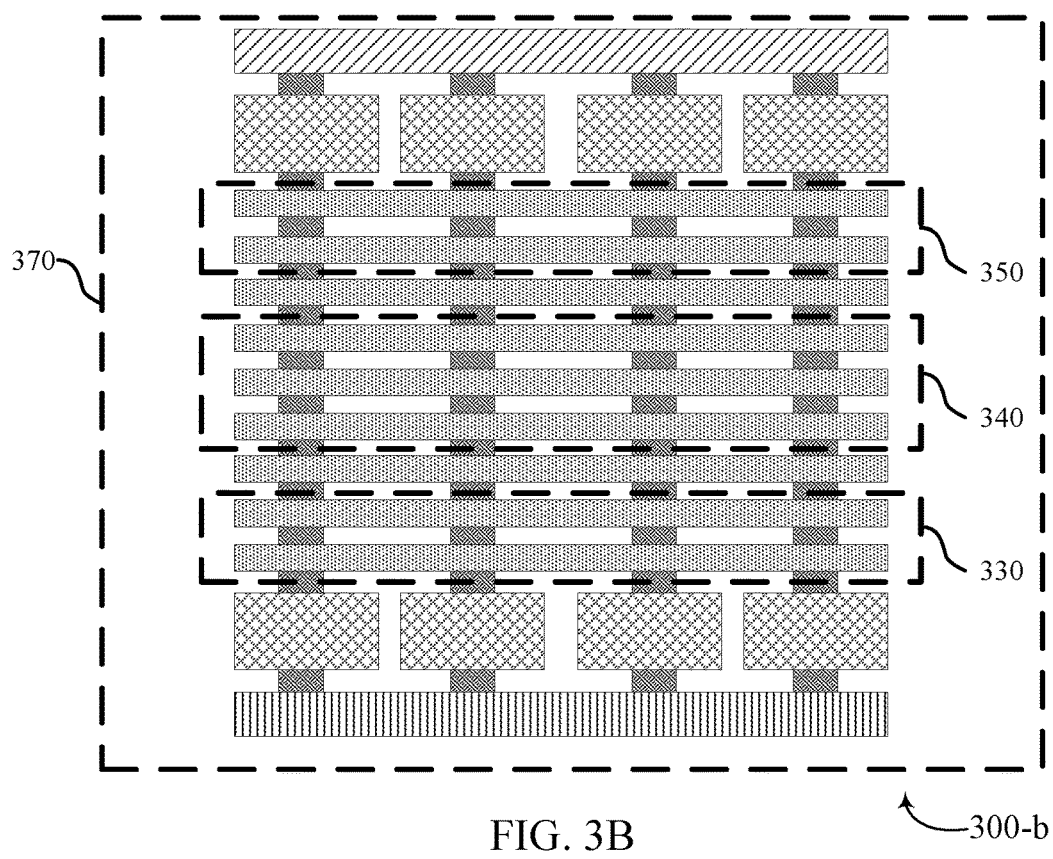

FIG. 3B illustrates an example of a memory device 300-*b* that supports memory block utilization in memory systems in accordance with examples as disclosed herein. In some cases, the memory device 300-*b* may be an illustrative example of a block 170 as described with reference to FIG. 1 or a block 275 as described with reference to FIG. 2. It should be appreciated that the components and features of the memory device 300-*b* are shown to illustrate functional interrelationships, and not necessarily actual physical positions within the memory device 300-*b*. Further, although some elements included in FIG. 3B are labeled with a numeric indicator, some other corresponding elements are not labeled, even though they are the same or would be understood to be similar, in an effort to increase visibility and clarity of the depicted features. With reference to FIG. 3B, the memory device 300-*b* including a block may be segmented by the memory system into several sub-blocks (e.g., sub-memory blocks), including sub-blocks 330, 340, and 350. Each sub-block may include a quantity of pages within the respective sub-block.

The memory system may segment a block into sub-blocks by assigning a quantity of pages within the block into sub-blocks. For example, a first sub-block 330 may include a quantity of pages (e.g., a quantity of pages with corresponding page numbers) within block, and sub-blocks 340 and 350 may include a quantity of pages within the block, where the quantity of pages in sub-blocks 330, 340, and 350 may be the same quantity, or a different quantity of pages. As an illustrative example, a block may be segmented into three sub-blocks, a first sub-block 330 (which may also be referred to as "Blk_X"), a second sub-block 340 ("Blk_Y"), and a third sub-block 350 ("Blk_Z"). The sub-block 330 may include a quantity of pages, (e.g., pages 0-175 of the block), the sub-block 340 may include a quantity of pages (e.g., pages 179-351 of the block), and the sub-block 350 may include a quantity of pages (e.g., pages 355-703 of the block), although each sub-block could contain any quantity of pages within any page range of a block.

Each sub-block may be processed independently from other sub-blocks. For example, the memory system may receive a command for a write operation, and divide portions of the write operation between sub-blocks. As an illustrative example, the first portion of an operation may be allocated to the sub-block 330, the second portion to the sub-block 340, etc., and the sub-blocks 330 and 340 may be processed independently from one another. Additionally, or alternatively, the memory system may allocate a portion of a command to a sub-block, and process portions of the command simultaneously, or in any order among sub-blocks. For example, the memory system may allocate the sub-block 350 a portion of a write command (e.g., a portion of data to write to memory cells within the sub-block 350), another portion of the write command to the sub-block 340, and a final portion to the sub-block 330.

Though each sub-block may be processed independently, and in any processing order, the pages within each sub-block may be processed sequentially. A processing order may refer to the sequence in which portions of a command are executed, or the sequence in which portions of a block are utilized (e.g., written to, read from, etc.). Sequential processing (e.g., sequential programming) refers to processing an operation on the sub-blocks within a block of a memory die according to an order, or the pages within a sub-block or block according to an order. As an example, sequential processing may include programming (e.g., writing data to) the pages within a block in ascending numerical order. Sequential programming may also refer to programming sub-blocks containing lower page numbers, then moving to sub-blocks with higher page numbers, in ascending order. Non-sequential processing (e.g., non-sequential programming) may refer to processing operations allocated to any sub-block in any order. Put another way, sub-blocks may be processed (e.g., written to, read from) non-sequentially. For example, a first block may execute a portion of a write command on its lowest page number, followed by a second block executing a portion on its lowest page number, then the first block may execute a next portion of the write command on its subsequent page number, (e.g., blkA_page1, blkA_page2, blkB_page500, blkC_page1000, blkB_page501, blkA_page3, blkC_page1001, blk_page501, etc). This may continue indefinitely, processing portions of allocated data to sub-blocks non-sequentially, but processing pages within sub-blocks in ascending sequential order, until all processing is complete. As an illustrative example, the memory system may divide a write operation between sub-blocks 330, 340, and 350. Sub-blocks 330, 340, and 350 may be processed (e.g., written to) independently, and in any order (e.g., sub-block 330, then 350, then 340, 350, and repeating in any order until all portions of the write command have processed). Within each sub-block, the pages may be written to in ascending sequential order, writing to the lowest page numbers first, then to higher page numbers, for example, such as writing to sub-block 330 page 0, then sub-block 340 page 179, then sub-block 330 page 1, sub-block 350 page 355, sub-block 340 page 180, etc.

The memory system may assign or allocate each sub-block within a block to a particular data type or specific operations. For example, instead of allocating an entire block to a particular data type that may utilize a small portion of the storage space or processing capability of block, the memory system may allocate several sub-blocks within the block to process multiple data types within the same block. For example, some data (e.g., special usage data) may utilize a small portion of the storage within a block (e.g., in the present UFS design, in the case of 8×B58R, the total amount of storage space available within one block is 2 GB). As an illustrative example, if three entire blocks are allocated to a type of special usage data, such as RPMB data, 6 GB of storage space is allocated by assigning three full blocks. However, the total storage capacity utilized for RPMB data may be 16 MB, for example. By assigning three sub-blocks (e.g., such as sub-blocks 330, 340, and 350) to process RPMB data as opposed to three full blocks, the total storage space allocated is reduced (e.g., from 6 GB to a portion of the 2 GB available within the block containing the sub-blocks 330, 340, and 350). Other types of data may be allocated to a sub-block, including special usage data. In some cases, data types that may be accessed infrequently (e.g., read-once data, rare usage data) may be allocated to a sub-block. For example, a sub-block 330 may be allocated as a power loss backup block. Because of the infrequency of power loss during a write operation (e.g., writing user data to a block or sub-block), a full block would be greatly overprovisioned if the full block was dedicated to power loss backup, and would reduce processing load by allocating one sub-block for use as a power loss backup log, sharing other portions of a block with other types of data. Other examples of data types that utilize small portions of storage space or processing resources may include, but are not limited to: RAIN parity data (e.g., read-once data), or a BBT (e.g., which utilizes a small portion of a full block).

In some cases, sub-blocks may have an associated reliability. For example, a block may contain two sub-blocks (e.g., sub-blocks 330 and 340). Sub-block 330 may contain a portion of the pages within block (e.g., the first half of pages within block), and may contain sub-block 340 may contain another portion of the pages within block (e.g., the second half of pages within block), though the pages within block may be segmented between sub-blocks in any quantity or ratio. Because pages within a sub-block may be written to sequentially, in some examples, sub-blocks containing some pages within a block may have increased, or decreased reliability when processed. In the example given above, sub-block 330 may contain the first half of pages within a block and sub-block 340 may contain the second half of pages. In some cases, the sub-block containing the second half of the pages may be more reliable (e.g., stable) than the sub-block containing the first half of the pages of the block. For example, if the memory system receives a command (e.g., a write command), and divides the write command between the blocks, or allocates sub-block 330 to one type of data and sub-block 340 to another type of data, sub-block 330 (with the first half of pages of block) may experience a slight decrease in reliability when compared with sub-block 340 (containing the second half of pages of block).

The memory system may thus prioritize data types which may be accessed more frequently or which would benefit from increased reliability by allocating these data types to sub-blocks which contain higher page numbers within a block. For example, a BBT may be prioritized to maintain the same reliability within a sub-block as would be experienced within a full block by allocating BBT data to the sub-block with the highest page numbers (e.g., such as sub-block 350 with reference to FIG. 3B). In contrast, a data type that contains read-once data, (e.g., RAIN parity data), may be allocated to a sub-block that contains the lower page numbers within the pages of a block, (e.g., sub-block 330).

Figure 4:
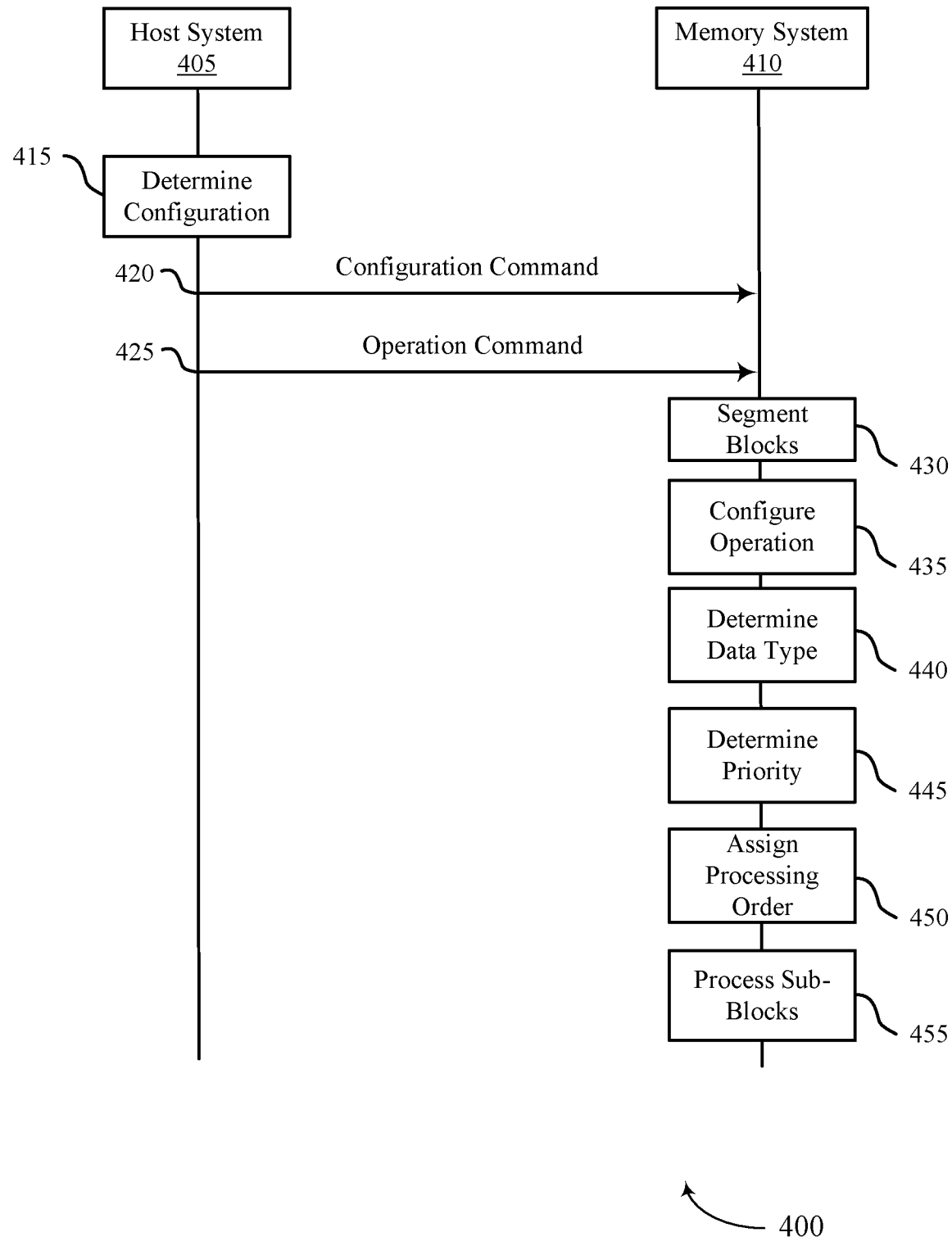
FIG. 4 illustrates an example of a process flow that supports memory block utilization in memory systems in accordance with examples as disclosed herein.

FIG. 4 illustrates an example of a process flow 400 that supports memory block utilization in memory systems in accordance with examples as disclosed herein. The process flow 400 may illustrate an example of aspects of a memory system as described with reference to FIGS. 1 and 2. For example, the process flow 400 may be implemented by a host system 405 or a memory system 410. One or both of the host system 405 or the memory system 410 may be examples of a host system 105 or a memory system 110 as described with reference to FIG. 1, or a memory system 210 as described with reference to FIG. 2. In the following description of the process flow 400, the operations between one or both of the host system 405 or the memory system 410 may be performed in a different order than the example order shown, or the operations performed by one or both of the host system 405 or the memory system 410 may be performed in different orders or at different times. Some operations may also be omitted from the process flow 400, and other operations may be added to the process flow 400. Aspects of the process flow 400 may be implemented by a controller, among other components. Additionally or alternatively, aspects of the process flow 400 may be implemented as instructions stored in memory (e.g., firmware stored in a memory device). For example, the instructions, when executed by a controller (e.g., the memory controller), may cause the controller to perform the operations of the process flow 400.

At 415, the host system 405 may determine the configuration of the memory system 410. For example, the host system 405 may determine the configuration of the memory device within the memory system, and determine a quantity or configuration (e.g., size, quantity of memory cells per memory block) of one or more memory blocks within the memory system 410. The configuration information may further include the type of memory cells (e.g., SLC cells), or the type of memory device within the memory system 410 (e.g., a non-volatile memory device). At 420, the host system 405 may transmit a configuration command indicating the memory block configuration to the memory system 410. At 425, the host system 405 may transmit an operation command to the memory system 410. The operation command may include write operations (e.g., a SLC write operation).

At 430, the memory system 410 may segment a memory block within a memory device into one or more sub-blocks (e.g., sub-memory blocks). Each sub-block may include a corresponding subset of memory cells of the set of memory cells within the memory block. The memory system 410 may segment the memory block into one or more sub-blocks based on the configuration information received from the host system at 420.

At 435, the memory system 410 may configure the operation received in the operation command. This may include configuring (e.g., segmenting or dividing) portions of the operation command between sub-blocks grouped at 430. For example, the memory system 410 may segment a first portion of the operation to a first sub-block, a second portion of the operation to a second sub-block, continuing until the entire operation is configured. At 440, the memory system 410 may determine a type of data associated with each sub-block. For example, based on the configuration of the operation command at 425, some sub-blocks may be allocated to process specific types of data (e.g., special use data).

At 445, the memory system 410 may determine a priority of each sub-block based on the data type allocated to each sub-block. The priority determined for each data type may be determined according to a reliability metric associated with each sub-block. For example, a sub-block containing a subset of memory cells within the set of memory cells of the memory block that are associated with higher page numbers may be associated with a higher reliability metric. A sub-block containing a subset of memory cells corresponding to lower page numbers may be associated with a lower reliability metric. The memory system 410 may thus determine a respective priority for data types associated with sub-blocks with respectively lower or higher reliability metrics. For example, a first sub-block associated with a first reliability and a second sub-block with a second reliability may be associated with a processing order determined based on the respective memory operation (e.g., a portion of the memory operation) allocated to each sub-block. Additionally, or alternatively, a first sub-block associated with a first reliability and a second sub-block associated with a second reliability may be associated with a processing order determined based on the respective data type (e.g., a portion of the operation corresponding to a data type) allocated to each sub-block.

At 450, the memory system 410 may assign a respective processing order for each sub-block. Assigning a respective processing order for each sub-block may be based on the determination at 445 of a respective priority of each sub-block based on the associated reliability metric and data type for each sub-block.

At 455, the memory system 410 may process each sub-block of the memory block. Each sub-block may be processed independently (e.g., non-sequentially) from each other sub-block. The processing may be based on the processing order assigned to each sub-block by the memory system 410 at 450. In some examples, portions of the operation allocated to a sub-block of the memory block may be processed according to the processing order, where the processing order may include processing some portions of the operation allocated to a first sub-block, then some portions of the operation allocated to a second sub-block, some portions allocated to a third sub-block, etc., until the operation is complete. This non-sequential processing which may alternate between sub-blocks allows for the priority assigned at 445 to be executed according to the processing order assigned based on the priority.

Additionally, or alternatively, while processing each sub-block (e.g., non-sequentially), the subset of memory cells assigned to each sub-block may be processed sequentially according to the processing order assigned at 450. For example, the subset of memory cells assigned to each sub-block may correspond to pages of the memory device (e.g., with associated page numbers). Although the sub-blocks may be processed (e.g., written to) non-sequentially according to the processing order, within each sub-block, the subset of memory cells allocated to the sub-block may be processed sequentially (e.g., in ascending order according to page number associated for the sub-set of memory cells).

Figure 5:
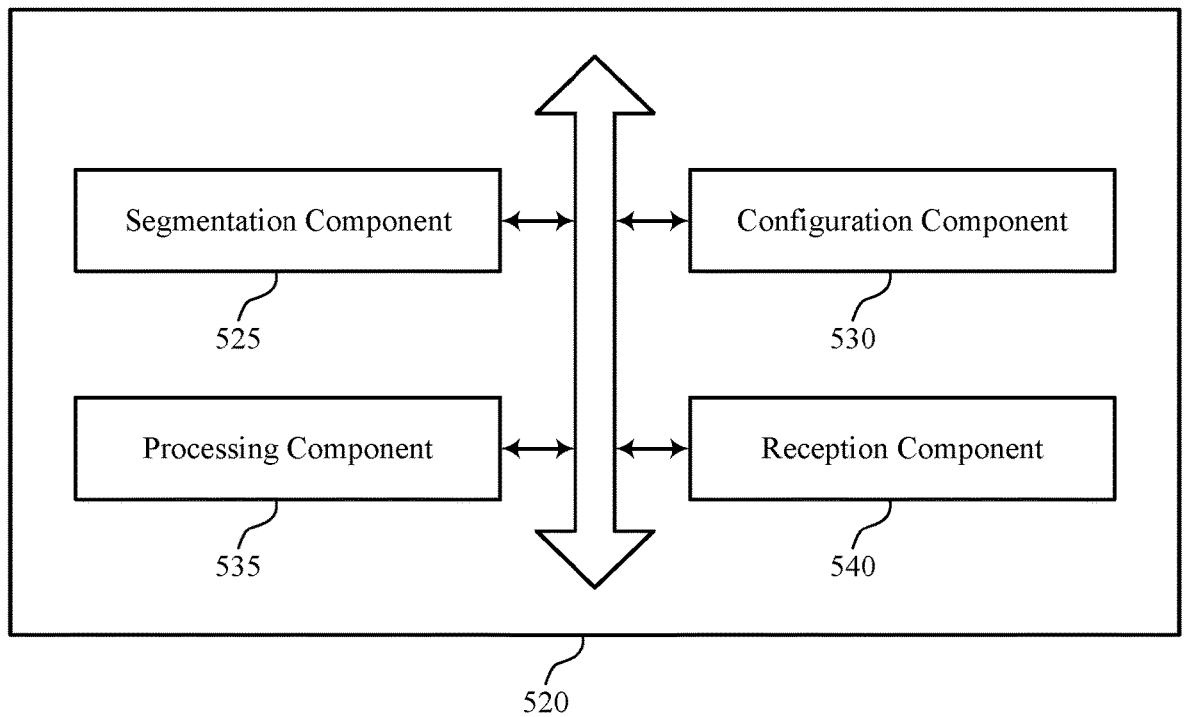
FIG. 5 illustrates an example of a block diagram of a memory system that supports memory block utilization in memory systems in accordance with examples as disclosed herein.

FIG. 5 shows a block diagram 500 of a memory system 520 that supports memory block utilization in memory systems in accordance with examples as disclosed herein. The memory system 520 may be an example of aspects of a memory system as described with reference to FIGS. 1 through 4. The memory system 520, or various components thereof, may be an example of means for performing various aspects of memory block utilization in memory systems as described herein. For example, the memory system 520 may include a segmentation component 525, a configuration component 530, a processing component 535, a reception component 540, or any combination thereof. Each of these components may communicate, directly or indirectly, with one another (e.g., via one or more buses).

The segmentation component 525 may be configured as or otherwise support a means for segmenting a memory block of a memory device into a plurality of sub-memory blocks, the memory block corresponding to a set of memory cells, each sub-memory block of the plurality of sub-memory blocks corresponding to a respective subset of memory cells of the set of memory cells. The configuration component 530 may be configured as or otherwise support a means for configuring a respective memory operation for each sub-memory block of the plurality of sub-memory blocks. The processing component 535 may be configured as or otherwise support a means for processing each sub-memory block of the plurality of sub-memory blocks independently based at least in part on the respective memory operation for each sub-memory block of the plurality of sub-memory blocks.

In some examples, the reception component 540 may be configured as or otherwise support a means for receiving a command indicating a memory block configuration. In some examples, the segmentation component 525 may be configured as or otherwise support a means for segmenting the memory block of the memory device into the plurality of sub-memory blocks based at least in part on the memory block configuration.

In some examples, the processing component 535 may be configured as or otherwise support a means for assigning a respective processing order for each sub-memory block of the plurality of sub-memory blocks. In some examples, the processing component 535 may be configured as or otherwise support a means for processing each sub-memory block of the plurality of sub-memory blocks independently based at least in part on the respective processing order for each sub-memory block of the plurality of sub-memory blocks.

In some examples, the processing component 535 may be configured as or otherwise support a means for determining a respective data type associated with each sub-memory block of the plurality of sub-memory blocks. In some examples, the processing component 535 may be configured as or otherwise support a means for assigning the respective processing order for each sub-memory block of the plurality of sub-memory blocks based at least in part on the respective data type associated with each sub-memory block of the plurality of sub-memory blocks.

In some examples, the processing component 535 may be configured as or otherwise support a means for determining a respective priority of the respective data type associated with each sub-memory block of the plurality of sub-memory blocks, the respective priority of the respective data type associated with each sub-memory block of the plurality of sub-memory blocks corresponding to a respective reliability metric associated with each sub-memory block of the plurality of sub-memory blocks. In some examples, the processing component 535 may be configured as or otherwise support a means for assigning the respective processing order for each sub-memory block of the plurality of sub-memory blocks based at least in part on the respective priority of the respective data type associated with each sub-memory block of the plurality of sub-memory blocks.

In some examples, to support processing each sub-memory block of the plurality of sub-memory blocks independently, the processing component 535 may be configured as or otherwise support a means for sequentially programming the plurality of sub-memory blocks based at least in part on the respective processing order for each sub-memory block of the plurality of sub-memory blocks. In some examples, to support processing each sub-memory block of the plurality of sub-memory blocks independently, the processing component 535 may be configured as or otherwise support a means for non-sequentially programming the plurality of sub-memory blocks based at least in part on the respective processing order for each sub-memory block of the plurality of sub-memory blocks.

In some examples, the plurality of sub-memory blocks includes a first sub-memory block associated with a first reliability and a second sub-memory block associated with a second reliability based at least in part on a respective processing order associated with the respective memory operation for the first sub-memory block and the second sub-memory block. In some examples, first sub-memory block is associated with a first data type and the second sub-memory block is associated with a second data type. In some examples, the respective processing order associated with the respective memory operation for the first sub-memory block and the second sub-memory block is further based at least in part on the first data type and the second data type. In some examples, the memory device includes a non-volatile memory device. In some examples, the memory block includes a SLC memory block. In some examples, the respective memory operation includes a SLC write operation.

Figure 6:
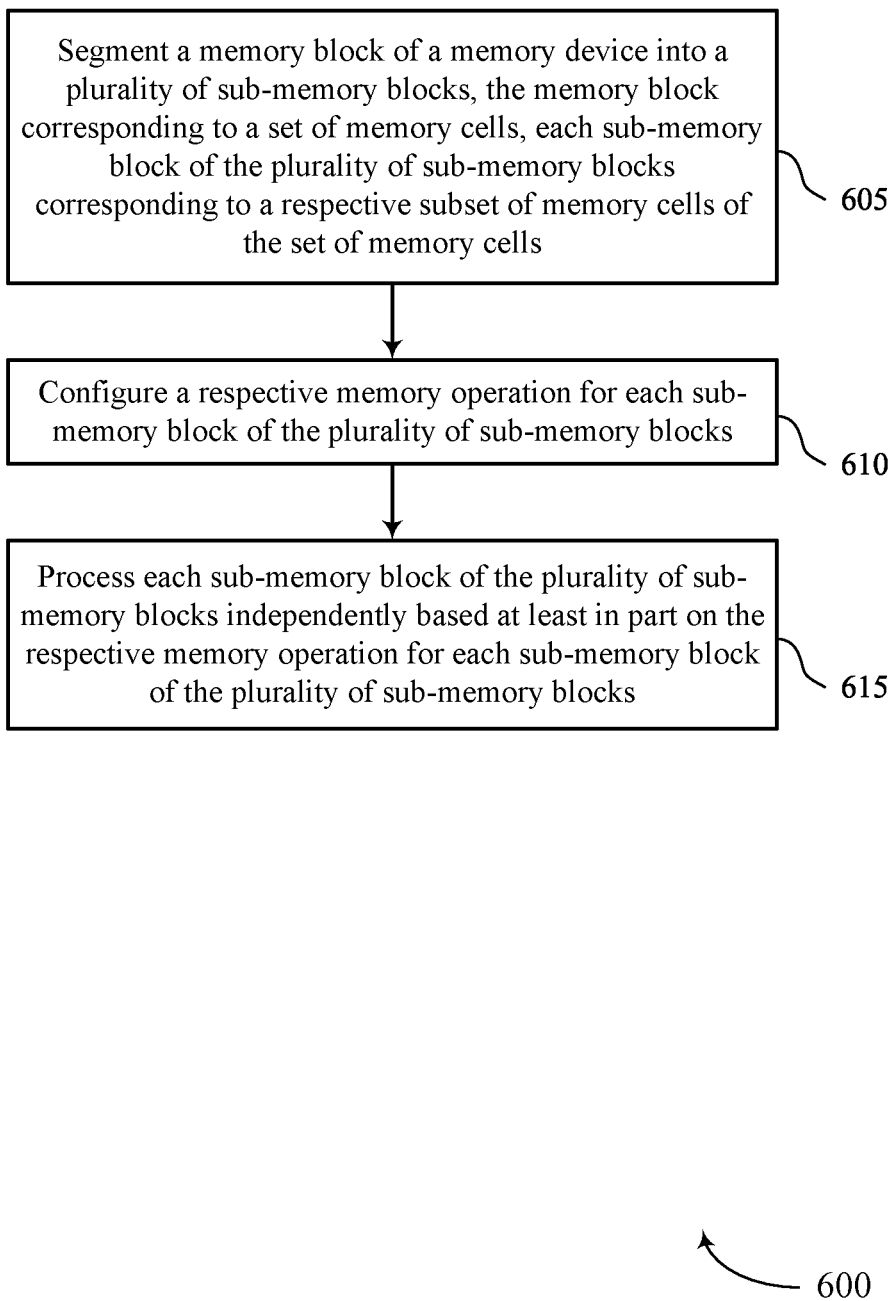
FIG. 6 illustrates an example of a method that supports memory block utilization in memory systems in accordance with examples as disclosed herein.

FIG. 6 shows a flowchart illustrating a method 600 that supports memory block utilization in memory systems in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include segmenting a memory block of a memory device into a plurality of sub-memory blocks, the memory block corresponding to a set of memory cells, each sub-memory block of the plurality of sub-memory blocks corresponding to a respective subset of memory cells of the set of memory cells. The operations of 605 may be performed in accordance with examples as disclosed herein. In some examples, aspects of the operations of 605 may be performed by a segmentation component 525 as described with reference to FIG. 5.

At 610, the method may include configuring a respective memory operation for each sub-memory block of the plurality of sub-memory blocks. The operations of 610 may be performed in accordance with examples as disclosed herein. In some examples, aspects of the operations of 610 may be performed by a configuration component 530 as described with reference to FIG. 5.

At 615, the method may include processing each sub-memory block of the plurality of sub-memory blocks independently based at least in part on the respective memory operation for each sub-memory block of the plurality of sub-memory blocks. The operations of 615 may be performed in accordance with examples as disclosed herein. In some examples, aspects of the operations of 615 may be performed by a processing component 535 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for segmenting a memory block of a memory device into a plurality of sub-memory blocks, the memory block corresponding to a set of memory cells, each sub-memory block of the plurality of sub-memory blocks corresponding to a respective subset of memory cells of the set of memory cells; configuring a respective memory operation for each sub-memory block of the plurality of sub-memory blocks; and processing each sub-memory block of the plurality of sub-memory blocks independently based at least in part on the respective memory operation for each sub-memory block of the plurality of sub-memory blocks.

Aspect 2: The method, apparatus, or non-transitory computer-readable medium of aspect 1, further including operations, features, circuitry, logic, means, or instructions, or any combination thereof for receiving a command indicating a memory block configuration and where segmenting the memory block of the memory device into the plurality of sub-memory blocks is further based at least in part on the memory block configuration.

Aspect 3: The method, apparatus, or non-transitory computer-readable medium of any of aspects 1 through 2, further including operations, features, circuitry, logic, means, or instructions, or any combination thereof for assigning a respective processing order for each sub-memory block of the plurality of sub-memory blocks and where processing each sub-memory block of the plurality of sub-memory blocks independently is further based at least in part on the respective processing order for each sub-memory block of the plurality of sub-memory blocks.

Aspect 4: The method, apparatus, or non-transitory computer-readable medium of aspect 3, further including operations, features, circuitry, logic, means, or instructions, or any combination thereof for determining a respective data type associated with each sub-memory block of the plurality of sub-memory blocks and where assigning the respective processing order for each sub-memory block of the plurality of sub-memory blocks is further based at least in part on the respective data type associated with each sub-memory block of the plurality of sub-memory blocks.

Aspect 5: The method, apparatus, or non-transitory computer-readable medium of aspect 4, further including operations, features, circuitry, logic, means, or instructions, or any combination thereof for determining a respective priority of the respective data type associated with each sub-memory block of the plurality of sub-memory blocks, the respective priority of the respective data type associated with each sub-memory block of the plurality of sub-memory blocks corresponding to a respective reliability metric associated with each sub-memory block of the plurality of sub-memory blocks and where assigning the respective processing order for each sub-memory block of the plurality of sub-memory blocks is further based at least in part on the respective priority of the respective data type associated with each sub-memory block of the plurality of sub-memory blocks.

Aspect 6: The method, apparatus, or non-transitory computer-readable medium of any of aspects 3 through 5 where processing each sub-memory block of the plurality of sub-memory blocks independently includes operations, features, circuitry, logic, means, or instructions, or any combination thereof for sequentially programming the plurality of sub-memory blocks based at least in part on the respective processing order for each sub-memory block of the plurality of sub-memory blocks.

Aspect 7: The method, apparatus, or non-transitory computer-readable medium of any of aspects 3 through 6 where processing each sub-memory block of the plurality of sub-memory blocks independently includes operations, features, circuitry, logic, means, or instructions, or any combination thereof for non-sequentially programming the plurality of sub-memory blocks based at least in part on the respective processing order for each sub-memory block of the plurality of sub-memory blocks.

Aspect 8: The method, apparatus, or non-transitory computer-readable medium of any of aspects 1 through 7 where the plurality of sub-memory blocks includes a first sub-memory block associated with a first reliability and a second sub-memory block associated with a second reliability based at least in part on a respective processing order associated with the respective memory operation for the first sub-memory block and the second sub-memory block.

Aspect 9: The method, apparatus, or non-transitory computer-readable medium of aspect 8 where first sub-memory block is associated with a first data type and the second sub-memory block is associated with a second data type and the respective processing order associated with the respective memory operation for the first sub-memory block and the second sub-memory block is further based at least in part on the first data type and the second data type.

Aspect 10: The method, apparatus, or non-transitory computer-readable medium of any of aspects 1 through 9 where the memory device includes a non-volatile memory device.

Aspect 11: The method, apparatus, or non-transitory computer-readable medium of any of aspects 1 through 10 where the memory block includes a SLC memory block.

Aspect 12: The method, apparatus, or non-transitory computer-readable medium of any of aspects 1 through 11 where the respective memory operation includes a SLC write operation.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

As used herein, the term "electrode" may refer to an electrical conductor, and in some examples, may be employed as an electrical contact to a memory cell or other component of a memory array. An electrode may include a trace, wire, conductive line, conductive material, or the like that provides a conductive path between elements or components of a memory array.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:
1. A memory system, comprising:
   one or more memory devices; and
   processing circuitry coupled with the one or more memory devices and configured to cause the memory system to:

receive a command indicating a quantity of pages assigned to a memory block of the one or more memory devices;

segment, based at least in part on receiving the command, the memory block into a plurality of sub-memory blocks in accordance with a respective quantity of pages assigned to each sub-memory block of the plurality of sub-memory blocks, the memory block corresponding to a set of memory cells, each sub-memory block of the plurality of sub-memory blocks corresponding to a respective subset of memory cells of the set of memory cells;

configure a respective memory operation for each sub-memory block of the plurality of sub-memory blocks; and process each sub-memory block of the plurality of sub-memory blocks independently based at least in part on the respective memory operation for each sub-memory block of the plurality of sub-memory blocks.

2. The memory system of claim 1, wherein the processing circuitry is further configured to cause the memory system to:

assign a respective processing order for each sub-memory block of the plurality of sub-memory blocks, wherein to process each sub-memory block of the plurality of sub-memory blocks independently is further based at least in part on the respective processing order for each sub-memory block of the plurality of sub-memory blocks.

3. The memory system of claim 2, wherein the processing circuitry is further configured to cause the memory system to:

determine a respective data type associated with each sub-memory block of the plurality of sub-memory blocks, wherein to assign the respective processing order for each sub-memory block of the plurality of sub-memory blocks is further based at least in part on the respective data type associated with each sub-memory block of the plurality of sub-memory blocks.

4. The memory system of claim 3, wherein the processing circuitry is further configured to cause the memory system to:

determine a respective priority of the respective data type associated with each sub-memory block of the plurality of sub-memory blocks, the respective priority of the respective data type associated with each sub-memory block of the plurality of sub-memory blocks corresponding to a respective reliability metric associated with each sub-memory block of the plurality of sub-memory blocks, wherein to assign the respective processing order for each sub-memory block of the plurality of sub-memory blocks is further based at least in part on the respective priority of the respective data type associated with each sub-memory block of the plurality of sub-memory blocks.

5. The memory system of claim 2, wherein processing each sub-memory block of the plurality of sub-memory blocks independently comprises the processing circuitry configured to cause the memory system to:

sequentially program the plurality of sub-memory blocks based at least in part on the respective processing order for each sub-memory block of the plurality of sub-memory blocks.

6. The memory system of claim 2, wherein processing each sub-memory block of the plurality of sub-memory blocks independently comprises the processing circuitry configured to cause the memory system to:

non-sequentially program the plurality of sub-memory blocks based at least in part on the respective processing order for each sub-memory block of the plurality of sub-memory blocks.

7. A memory system, comprising:

one or more memory devices; and processing circuitry coupled with the one or more memory devices and configured to cause the memory system to:

segment a memory block of the one or more memory devices into a plurality of sub-memory blocks based at least in part on assigning a respective quantity of pages to each sub-memory block of the plurality of sub-memory blocks, the memory block corresponding to a set of memory cells, each sub-memory block of the plurality of sub-memory blocks corresponding to a respective subset of memory cells of the set of memory cells;

configure a respective memory operation for each sub-memory block of the plurality of sub-memory blocks; and process each sub-memory block of the plurality of sub-memory blocks independently based at least in part on the respective memory operation for each sub-memory block of the plurality of sub-memory blocks, wherein the plurality of sub-memory blocks comprises a first sub-memory block associated with a first reliability and a second sub-memory block associated with a second reliability based at least in part on a respective processing order associated with the respective memory operation for the first sub-memory block and the second sub-memory block.

8. The memory system of claim 7, wherein:

the first sub-memory block is associated with a first data type and the second sub-memory block is associated with a second data type, and the respective processing order associated with the respective memory operation for the first sub-memory block and the second sub-memory block is further based at least in part on the first data type and the second data type.

9. The memory system of claim 1, wherein the one or more memory devices comprise one or more non-volatile memory devices.

10. The memory system of claim 1, wherein the memory block comprises a single level cell memory block.

11. The memory system of claim 1, wherein the respective memory operation comprises a single level cell write operation.

12. A non-transitory computer-readable medium storing code comprising instructions which, when executed by one or more processors of a memory system, cause the memory system to:

receive a command indicating a quantity of pages assigned to a memory block of a memory device;

segment, based at least in part on receiving the command, the memory block of a memory device into a plurality of sub-memory blocks in accordance with a respective quantity of pages assigned to each sub-memory block of the plurality of sub-memory blocks, the memory block corresponding to a set of memory cells, each sub-memory block of the plurality of sub-memory blocks corresponding to a respective subset of memory cells of the set of memory cells;

configure a respective memory operation for each sub-memory block of the plurality of sub-memory blocks; and process each sub-memory block of the plurality of sub-memory blocks independently based at least in part on the respective memory operation for each sub-memory block of the plurality of sub-memory blocks.

13. The non-transitory computer-readable medium of claim 12, wherein the instructions, when executed by the one or more processors of the memory system, further cause the memory system to:

assign a respective processing order for each sub-memory block of the plurality of sub-memory blocks, wherein to process each sub-memory block of the plurality of sub-memory blocks independently is further based at least in part on the respective processing order for each sub-memory block of the plurality of sub-memory blocks.

14. The non-transitory computer-readable medium of claim 13, wherein the instructions, when executed by the one or more processors of the memory system, further cause the memory system to:

determine a respective data type associated with each sub-memory block of the plurality of sub-memory blocks, wherein to assign the respective processing order for each sub-memory block of the plurality of sub-memory blocks is further based at least in part on the respective data type associated with each sub-memory block of the plurality of sub-memory blocks.

15. The non-transitory computer-readable medium of claim 14, wherein the instructions, when executed by the one or more processors of the memory system, further cause the memory system to:

determine a respective priority of the respective data type associated with each sub-memory block of the plurality of sub-memory blocks, the respective priority of the respective data type associated with each sub-memory block of the plurality of sub-memory blocks corresponding to a respective reliability metric associated with each sub-memory block of the plurality of sub-memory blocks, wherein to assign the respective processing order for each sub-memory block of the plurality of sub-memory blocks is further based at least in part on the respective priority of the respective data type associated with each sub-memory block of the plurality of sub-memory blocks.

16. The non-transitory computer-readable medium of claim 13, wherein the instructions to process each sub-memory block of the plurality of sub-memory blocks independently, when executed by the one or more processors of the memory system, cause the memory system to:

sequentially program the plurality of sub-memory blocks based at least in part on the respective processing order for each sub-memory block of the plurality of sub-memory blocks.

17. The non-transitory computer-readable medium of claim 13, wherein the instructions to process each sub-memory block of the plurality of sub-memory blocks independently, when executed by the one or more processors of the memory system, cause the memory system to:

non-sequentially program the plurality of sub-memory blocks based at least in part on the respective processing order for each sub-memory block of the plurality of sub-memory blocks.

18. A method by a memory system, comprising:

receiving a command indicating a quantity of pages assigned to a memory block of a memory device;

segmenting, based at least in part on receiving the command, the memory block into a plurality of sub-memory blocks in accordance with a respective quantity of pages assigned to each sub-memory block of the plurality of sub-memory blocks, the memory block corresponding to a set of memory cells, each sub-memory block of the plurality of sub-memory blocks corresponding to a respective subset of memory cells of the set of memory cells;

configuring a respective memory operation for each sub-memory block of the plurality of sub-memory blocks; and processing each sub-memory block of the plurality of sub-memory blocks independently based at least in part on the respective memory operation for each sub-memory block of the plurality of sub-memory blocks.

19. The method of claim 18, further comprising:

assigning a respective processing order for each sub-memory block of the plurality of sub-memory blocks, wherein processing each sub-memory block of the plurality of sub-memory blocks independently is further based at least in part on the respective processing order for each sub-memory block of the plurality of sub-memory blocks.

20. The method of claim 19, further comprising:

determining a respective data type associated with each sub-memory block of the plurality of sub-memory blocks, wherein assigning the respective processing order for each sub-memory block of the plurality of sub-memory blocks is further based at least in part on the respective data type associated with each sub-memory block of the plurality of sub-memory blocks.

* * * * *